Patented May 17, 1949

2,470,141

UNITED STATES PATENT OFFICE 2,470,141

ADHESIVE WATERPROOF PLASTIC COMPOSITION

Lawrence C. Caves, Tulsa, Okla.

No Drawing. Application July 20, 1945,
Serial No. 606,293

3 Claims. (Cl. 260—758)

This invention relates to a novel and improved plastic waterproof composition which is resilient, highly ductile and highly adhesive at zero ±2° F. temperature, and does not flow at a temperature of 140° F. ±2° F. The composition, of course, may have these characteristics considerably above and below this temperature range, but it is important that these characteristics be present within this range if the composition is used for some purposes. The composition is also cohesive and tenaciously adhesive to other objects, semi-solid and not brittle, highly ductile, and is not disadvantageously susceptible to temperature changes within the temperature range from zero ±2° F. to 140° F. ±2° F. This tenacity for adhering to other objects is not confined to objects of any particular kind and is a quality which provides a secure bond with the objects to which the adhesive is applied whether the surfaces of the objects be smooth or rough and irregular.

The composition has many and varied uses, but is especially suitable for bonding articles together and providing watertight joints between objects. It is particularly suitable for filling or covering joints in floors, walls, paving and other building and masonry structures in which there are joints to be filled or covered to provide a watertight joint. The composition material fills or covers the joint and adheres to the adjacent parts under all weather conditions to permit relative movement of the parts comprising the construction, but preventing any cracks or fissures developing in the joints in or over which the composition is placed. Cracks and fissures do not develop in the composition material itself or between the composition and the objects to which it is adhered. The material is especially suitable for filling and covering joints in concrete masonry construction such as walls, floors, pavements, and the like since it can be applied at any season of the year, can be hot-poured in place to not only fill or cover the joint or crack, but will be retained in bonded relation with the masonry walls of the space. It permits relative movement in the masonry or building structure due to contraction and expansion without breaking or cracking and without breaking away from the parts of the building or masonry to which it is adhered.

The adhesive composition is poured in place or applied to the object preferably in a fluid condition while heated to a temperature of a maximum of about 450° F. No special treatment is needed for the surface of the object to which the adhesive is to be applied, but it is preferable to remove dust and loose particles from the surface. The tenacious bonding is secured irrespective of the condition of the surfaces to which the adhesive is applied, but the surfaces preferably should be dry, and free from moisture.

The composition is typified by the following formula with the ingredients in proportions, by weight, as designated:

| | Percent |
|---|---|
| Petroleum or native asphalt | 30 to 60 |
| Rubber | 15 to 35 |
| Bituminous flux | 5 to 20 |
| Naphthenic oil | 5 to 20 |
| Filler | 3 to 5 |

The filler is not an indispensable ingredient and may or may not be included in the composition. If the filler be used, it is preferably finely divided. Ground asbestos, vermiculite and the like typify suitable fillers. The fillers, if used, should be thoroughly distributed throughout the composition.

The petroleum or native asphalts should have a softening point of about 160° F. to 220° F. and a penetration from 0 to 10 mm./10 at 77° F. A softening point of about 185° F. is preferable. Petroleum asphalts are especially suitable and advantageously constitute the base and major proportion of the asphaltic material used in the composition. Native asphalts, such as Trinidad, also are suitable and may be used alone or in combination with asphaltites or petroleum asphalts. If native asphalts and asphaltites are employed in combination with the petroleum asphalt, they should be used in minor proportion to the petroleum asphalt. The preferred proportion of the asphalt in the composition is about 50% by weight although the proportion may vary in a range from about 30 to 60 per cent.

Naphthenic oils are a fraction separated from the paraffinic fraction in mineral oils. Mineral oils are commonly separated by different processes, particularly by solvents, into fractions which are more paraffinic and naphthenic than the original oil. The separated paraffinic fraction is a high viscosity index oil whereas the separated naphthenic fraction is a rather poor grade of low viscosity index oil. The separated naphthenic fraction is of different grades having a high or low viscosity range depending on the kind of mineral oils which have been separated into these fractions. Heavy naphthenic oil fractions are preferable, but the lighter viscosity grade naphthenic fractions may be employed, particularly in conjunction with a heavier grade. A heavy naphthenic bright stock which is preferable is one having a viscosity of about 350 seconds or higher, Saybolt Universal method, at 210° F. The viscosity should not be below 300 seconds. Lighter naphthenic oils could be added to the heavy grade naphthenic oil if the viscosity is not brought below 300 seconds. Those naphthenic oils obtained from treating Mid-Continent and Gulf Coast oils to produce high viscosity index lubricating oils are particularly suitable.

Pennsylvania crude hydrocarbon oils are superior to ordinary lubricating oils because of a natural property of the Pennsylvania oils which enables them to withstand great variations in temperature without undergoing the very high degree of change in viscosity that occurs when ordinary oils are subjected to such changes in temperature. Many other hydrocarbon oils do not have this quality, such for example as Gulf Coast oils, because they contain low along with high viscosity index constituents, but are of equal grade with the Pennsylvania oil after the low viscosity index constituents have been removed. Gulf Coast oils have a viscosity index of about zero and Mid-Continent oils a viscosity of from about 50 to about 75 as compared with a viscosity index of 100 for Pennsylvania.

Any of these hydrocarbon oils which have a relatively low viscosity index contain paraffinic and naphthenic constituents. It is the naphthenic constituents which tend to give the oil the low viscosity index. Therefore, if they are removed the remaining oil will have a substantially higher viscosity index than the original. High viscosity index oils are produced from these oils by removing the naphthenic constituents from the original oil. Some of the original hydrocarbon oils contain asphalt, and the asphalt is retained in the naphthenic constituents that are removed from the paraffinic constituents. Naphthenic constituent materials with or without asphalt may be used as a component in the composition of the instant invention.

One common method for separating the paraffinic constituents from the naphthenic constituents is by a solvent process. Suitable solvents for use in the solvent process are any which have a selective action for either the high or low viscosity index portion of the oil and which will permit one of these constituents to be separated from the other in a centrifuge. Halogenated ether, such as dichlorethyl ether, is particularly satisfactory when the hydrocarbon oil contains asphalic material. This naphthenic constituent and other impurities which are removed from the high viscosity fraction of the oil by the separation process is of relatively heavy grade and is designated and known to the trade as heavy naphthenic bright stock. Thus they are here designated as the preferred type of naphthenic oil in making up the composition herein described.

The rubber ingredient may be comprised of natural rubber or a major proportion of it. Either reclaimed or synthetic rubber, or some of both, may be used, without essentially changing the characteristics of the waterproof plastic composition. Reclaimed rubber varies in quality and therefore is not prescribed as a complete substitute for the natural rubber. If, however, the reclaimed rubber were of a high grade, it could be used entirely as a substitute. Synthetic rubber can be substituted for natural rubber provided it can be properly broken down to a suitable consistency by working on a rubber mill for mixing with the other ingredients. The rubber improves the adhesiveness and ductility of the composition at low temperature and gives its resiliency within the critical temperature range of zero +2° F. to 140° +2° F. The preferred proportion of the rubber is 20 or 25 per cent, by weight, but it may vary within a range from 15 to 35 per cent.

The bituminous flux is typified by residual oils, such as asphaltum oil, liquid asphalt, flux oil, road oil, dust-laying oil, black oil and petroleum tailings. They are the liquid to semi-solid residues obtained from the distillation of non-asphaltic petroleum, semi-asphaltic and asphaltic petroleums, pressure tar, and "cut-back asphalt." The bituminous flux may comprise any one or any combination of two or more of these flux oils.

Residual asphalt is also suitable as the bituminous flux in lieu of or in combination with the residual oils. Preferably the residual asphalt is of a type meeting the following specifications and is preferred for use in the composition rather than the residual oils:

Viscosity (Saybolt-Furol) at 210° F. of 300 to 500 seconds;
Cleveland open cup flash point 300° F. to 650° F.;
Basic sediment test having maximum $\frac{1}{10}$ of one per cent using benzol as solvent;
Free of moisture—no foaming at 300° F.

The bituminous flux is a softener for the petroleum or native asphalt and the rubber and gives a softer and more homogeneous mixture, thereby permitting less naphthenic bright stock being used than if no bituminous flux were included. Therefore, the bituminous flux is preferably included in the composition but is not indispensable. The preferred proportion, by weight, of the bituminous flux is about 10 per cent but this may vary in a range from 5 to 20 per cent. The flux, typified by residual asphalt, residual oil or equivalent softener for the petroleum or native asphalt, is bituminous and is referred to herein for general reference as a bituminous flux.

To form the composition above described, the rubber ingredient is broken down on a rubber mill and milled. Some of the naphthenic bright stock is, a little at a time, added to the rubber as it is being milled and worked into the rubber milling operation, and also the subsequent mixing operation in which the milled rubber and the other ingredients are placed together in the mixer for mixing. The mixer is heated to a temperature of about 180° F. while the mixing operation is continued. Any mixer is suitable, but one having a series of paddles rotating at different speeds is preferable as this more effectively mixes the ingredients together into a homogeneous mass without balling up in the mixer. For heating the contents of the mixer during the mixing operation, a steam-jacketed mixer may be used.

The formula typifying the invention is particularly suitable for filling joints in concrete paving, and meets the requirements and tests of the "Federal Specification for Filler; Joint-Sealing, Hot-Poured Type (For Concrete)." This specification is known as SS-F-336 of May 6, 1942, and is referred to and incorporated herein as setting forth some of the characteristics of the product of the instant case and as setting forth an instance of the need for a product having the qualities of the composition herein disclosed. Reference is particularly made to the bond and flow tests of this "Federal Specification for Filler."

While the invention has been specifically described for purpose of illustration for various uses and more particularly for filling material for joints in concrete highway paving, it will be understood that there may be various changes in details of composition without departing from the spirit of the invention.

I claim:

1. An adherent plastic waterproof composition which stretches at 0° F. but at the same time maintains adhesion to a surface to which it has been applied when hot comprising asphalt having a softening point of about 160° to 220° F. and a penetration from 0 to 10 mm./10 at 77° F., rubber, residual asphalt having a viscosity at 210° F. of 300 to 500 seconds, a flash point from 300° to 650° F., a sediment content of not more than $\frac{1}{10}$ of one per cent, and free from moisture, and naphthenic oil having a viscosity as measured by Saybolt's viscosimeter of not below about 300 seconds at 210° F.

2. An adherent plastic waterproof composition comprising, by weight, about 30 to 60 per cent asphalt, having a softening point of about 160° to 220° F. and a penetration from 0 to 10 mm./10 at 77° F., about 15 to 35 per cent rubber, about 5 to 20 per cent bituminous flux having a viscosity at 210° F. of 300 to 500 seconds, a flash point from 300° to 650° F., a sediment content of not more than $\frac{1}{10}$ of one per cent and free from moisture, and about 5 to 20 per cent naphthenic oil having a viscosity as measured by Saybolt's viscosimeter not below about 300 seconds at 210° F.

3. An adherent plastic waterproof composition which stretches at 0° F. but at the same time maintains adhesion to a surface to which it has been applied when hot adapted to be heated and hot-poured and prepared from a mixture of asphalt having a softening point of about 160° to 220° F. and a penetration from 0 to 10 mm./10 at 77 F., rubber, a bituminous flux having a viscosity at 210° F. of 300 to 500 seconds, a flash point from 300° to 650° F., a sediment content of not more than $\frac{1}{10}$ of one per cent, and free from moisture, and naphthenic oil having a viscosity as measured by Saybolt's viscosimeter of not below about 300 seconds at 210° F.

LAWRENCE C. CAVES.

REFERENCES CITED

The following references are of record in the file of this patent:

UNITED STATES PATENTS

| Number | Name | Date |
| --- | --- | --- |
| 734,483 | Whitall | July 21, 1903 |
| 2,066,459 | Dillehay | Jan. 5, 1937 |
| 2,092,332 | Plaizier | Sept. 7, 1937 |
| 2,215,383 | Warner | Sept. 17, 1940 |
| 2,337,339 | McCluer | Dec. 21, 1943 |

FOREIGN PATENTS

| Number | Country | Date |
| --- | --- | --- |
| 216,245 | Great Britain | Mar. 3, 1923 |
| 216,602 | Great Britain | June 5, 1924 |
| 434,317 | Great Britain | Aug. 29, 1935 |

OTHER REFERENCES

Rubber Grower Asso. Bull. of June 1935, pp. 250–254.